United States Patent [19]

Matsumoto et al.

[11] Patent Number: 4,957,896
[45] Date of Patent: Sep. 18, 1990

[54] CATALYST FOR PURIFICATION OF EXHAUST GASES

[75] Inventors: Shinichi Matsumoto; Toru Tanaka, both of Aichi; Yutaka Ishikawa; Shinji Matsuura, both of Shizuoka; Hirofumi Shinjoh; Masakuni Ozawa, both of Aichi, all of Japan

[73] Assignees: Toyota Jidosha Kabushiki Kaisha Cataler Industrial Co. Ltd; Kabushiki Kaisha Toyota Chuo Kenkusho, both of Japan

[21] Appl. No.: 323,691

[22] Filed: Mar. 15, 1989

[30] Foreign Application Priority Data

Mar. 24, 1988 [JP] Japan ................................ 63-70214

[51] Int. Cl.$^5$ .................... B01J 21/04; B01J 21/06; B01J 23/10; B01J 23/40
[52] U.S. Cl. ................................ 502/304; 423/213.5
[58] Field of Search ................ 502/304; 423/213.5

[56] References Cited

U.S. PATENT DOCUMENTS

| | | | |
|---|---|---|---|
| 4,294,726 | 10/1981 | Bozon et al. | 502/304 |
| 4,316,822 | 2/1982 | Fujitani et al. | 423/213.5 X |
| 4,504,598 | 3/1985 | Ono et al. | 502/303 |
| 4,581,343 | 4/1986 | Blanchard et al. | 502/304 X |
| 4,587,231 | 5/1986 | Sawamura et al. | 502/304 |
| 4,624,940 | 11/1986 | Wan et al. | 502/251 |
| 4,702,897 | 10/1987 | Onal | 423/213.5 |

FOREIGN PATENT DOCUMENTS 54-31210 3/1977 Japan.

OTHER PUBLICATIONS

SAE Technical Paper Series, "Sulfur Storage and Release Automotive Catalysts", (Authors) M. G. Henke, J. J. White, and G. W. Denison of Allied Signal, Inc. No. 872134 (1987).

Primary Examiner—W. J. Shine
Attorney, Agent, or Firm—Finnegan, Henderson, Farabow, Garrett & Dunner

[57] ABSTRACT

A catalyst for purification of exhaust gases comprising: a support substrate; an active alumina coating layer comprising at least one of nickel oxide and cobalt oxide formed on the surface of the support substrate; a composite oxide comprising cerium oxide and zirconium oxide formed in the active alumina coating layer; and noble metal catalyst ingredients comprising at least one of platinum, palladium and rhodium loaded on the active alumina coating layer. The catalyst offers a decreased hydrogen sulfide $H_2S$ emission and conversion ratios for hydrocarbon (HC), carbon monoxide (CO), and nitrogen oxides (NOx) equivalent to or superior to those of conventional catalysts.

8 Claims, No Drawings

CATALYST FOR PURIFICATION OF EXHAUST GASES

BACKGROUND OF THE INVENTION

1. Field of the Invention

This invention relates to a catalyst for purification of exhaust gases capable of purifying exhaust gases containing carbon monoxide (CO), hydrocarbon (HC), nitrogen oxides (NOx) and sulfur oxides (SOx) from internal combustion engines of automobiles and the like, and more particularly the catalyst also capable of preventing sulfur oxides deposited on the catalyst from being reduced by hydrogen, hydrocarbon and so on and being exhausted as hydrogen sulfide.

2. Prior Art

As a conventional catalyst for purification of exhaust gases, there has generally been known a catalyst comprising a support substrate, an active alumina coating layer formed on surface of the support substrate and catalyst ingredients loaded on the active alumina coating layer.

This catalyst for purification of exhaust gases oxidizes and decreases HC and CO contained in exhaust gases exhausted from internal combustion engines, and reduces and decreases NOx contained in the exhaust gases. Sulfur dioxide ($SO_2$), generated by burning sulfur in fuel, is deposited and stored on the active alumina coating layer or a catalyst carrier layer as sulfur trioxide ($SO_3$) by oxidation reaction in oxidizing atmosphere. Under a condition where a catalyst bed temperature is more than about 600° C. and exhaust gases are rich in unburnt hydrocarbon and carbon monoxide, however, reductive hydrogen is generated by a noble metal catalyst and hydrogen-sulfide is generated by reducing the sulfur trioxide deposited on the catalyst carrier layer with the reductive hydrogen. As a result, exhaust gases having malodor is often exhausted when the fuel is a sulfur-rich fuel.

As a method for controlling the hydrogen sulfide exhaustion, an additional catalyst has been provided for reducing the hydrogen sulfide a disclosed in Japanese Examined Utility Model Publication (KOKOKU) No. 31210/1979.

Also, SAE Technical Paper Series 872134 November 2–5, 1987 discloses a 3-way catalyst controlling exhaustion of the hydrogen sulfide by reducing the hydrogen sulfide with added nickel. The 3-way catalyst is a catalyst capable of purifying CO, HC and NOx simultaneously.

However, it is not preferred to provide the additional catalyst for reducing the hydrogen sulfide because of increasing cost and weight. In another method, in which nickel is added to the 3-way catalyst, the surface area of the active alumina decreases and the catalytic activity decreases, because the active alumina loading the noble metal catalyst ingredients thereon reacts with nickel at elevated temperature, to form $NiAl_2O_4$ having a spinel-type structure, for example.

Accordingly, it is an object of this invention to provide a catalyst having high activity for purification of exhaust gases, and being capable of suppressing the reaction of nickel with active alumina as well as being capable of suppressing the emission of the hydrogen sulfide.

SUMMARY OF THE INVENTION

A catalyst for purification of exhaust gases of this invention comprises a support substrate, an active alumina coating layer comprising at least one of nickel oxide and cobalt oxide formed on the surface of the support substrate, composite oxide comprising cerium oxide and zirconium oxide formed in the active alumina coating layer, and noble metal catalyst ingredients comprising at least one of platinum, palladium and rhodium loaded on the active alumina coating layer.

The emission of the hydrogen sulfide in exhaust gases is suppressed by reacting the hydrogen sulfide formed in the catalyst for purification of exhaust gases with the nickel oxide and/or cobalt oxide to sulfides. Also, the composite oxide comprising cerium oxide and zirconium oxide is formed in the active alumina coating layer to prevent the deteriorating of the effect of suppressing the hydrogen sulfide emission by the nickel oxide and/or cobalt oxide. The deterioration occurs because the nickel oxide and/or cobalt oxide reacts with the active alumina in the coating layer at elevated temperature.

Thus, the hydrogen sulfide formed on the catalyst for purification of exhaust gases is caught in the catalyst and the generation of malodorous exhaust gases has been prevented because the nickel oxide and/or cobalt oxide are contained in the active alumina coating layer and the composite oxide comprising cerium oxide and zirconium oxide is formed in the active alumina coating layer. Further, this catalyst for purification of exhaust gases has the same degree of the catalytic activity comparable with the conventional catalysts.

DETAILED DESCRIPTION OF THE INVENTION

A catalyst for purification of exhaust gases of this invention comprises a support substrate, an active alumina coating layer comprising at least one of nickel oxide and cobalt oxide formed on surface of the support substrate, composite oxide comprising cerium oxide and zirconium oxide formed in the active alumina coating layer, and noble metal catalyst ingredients comprising at least one of platinum, palladium and rhodium loaded on the active alumina coating layer.

As for the support substrate, a conventional support substrate such as a honeycomb-shape monolithic support substrate and a pellet-shape support substrate may be used. Also, as for material of the support substrate, conventional ceramic such as cordierite, mullite, alumina, magnesia and spinel or conventional heat resistant metal such as ferritic steel may be used.

The active alumina coating layer is formed on surface of the support substrate, and the catalyst ingredients are loaded thereon. As for the active alumina coating layer, substance having a large specific surface area such as active alumina, zirconia, titanium oxide and the like may be used, however, gamma-alumina and theta-alumina are generally used for the active alumina coating layer.

Nickel oxide and cobalt oxide contained in the active alumina coating layer are provided by adding and mixing them to the active alumina when the active alumina coating layer is formed. The nickel oxide and cobalt oxide suppress the emission of the hydrogen sulfide by reacting with the hydrogen sulfide to form nickel sulfide and cobalt sulfide.

Particle diameters of nickel oxide and cobalt oxide are in a range of 0.1 to 30 $\mu$m. Further, it is preferred that they are in a range of 2 to 10 μm. If they are less than 0.5 μm, the nickel oxide and cobalt oxide react too much with the alumina at elevated temperature. On the other hand, if they exceed 30 μm, the effect of suppressing hydrogen sulfide emission is deteriorated.

Also, addition amounts of nickel oxide and cobalt oxide to active alumina are in a range of 0.01 to 0.5 mol/λ. Further, it is preferred that they are in a range of 0.02 to 0.30 mol/λ. If they are less than 0.01 mol/λ, the effect of suppressing hydrogen sulfide emission is less. On the other hand, if they exceed 0.5 mol/λ, durability of the catalyst for purification of exhaust gases is deteriorated. Here, the unit "mol/λ" means the number of moles per unit apparent volume of the support substrate.

The composite oxide comprising cerium oxide and zirconium oxide is loaded on the active alumina coating layer. To form this composite oxide, the active alimuna coating layer is impregnated in aqueous solutions of water soluble cerium salt and zirconium salt simultaneously or separately, and is calcined at a temperature of 600° C. or more. Thus, the composite oxide and/or solid solution comprising cerium oxide and zirconium oxide can be formed. If the temperature of calcining is less than 600° C., it is hard to form the composite oxide, and the growth of cerium oxide particles is facilitated.

There is no special limitation on the ratio between the cerium and the zirconium, however, it is preferred that the ratio of number of atoms between the zirconium and the cerium present in the form of composite oxide and/or solid solution is 5:95 to 80:20. If the ratio of number of atoms is less than 5:95, the growth of cerium oxide particles is facilitated. On the other hand, if it exceeds 80:20, the catalytic activity is worsened since the oxygen storing capability is poor.

This composite oxide $(Ce,Zr)O_2$ comprising cerium oxide and zirconium oxide has an excellent heat resistance and improves the activity of the 3-way catalyst compared with the 3-way catalyst containing cerium oxide only in the active alumina coating layer. Namely, the oxygen storing capability is enhanced. The oxygen storing capability means the capability of sorption and release of oxygen. Also, the composite oxide suppresses the growth of the nickel oxide and cobalt oxide particles, and ensures suppression of the hydrogen sulfide emission for a long time. Further, the composite oxide suppresses the formation of the composite oxide having the spinel-type crystal structure formed by solidification of nickel oxide and cobalt oxide in the active alumina at elevated temperature. Therefore, the composite oxide suppresses the decrease of the surface area of the active alumina, and the decrease of the catalytic activity. To obtain the above mentioned effect, nickel oxide and cobalt oxide are dispersed in the active alumina deposited on the support substrate. Further, it is needed that the composite oxide comprising cerium oxide and zirconium oxide is formed and loaded in the active alumina coating layer.

To allow the composite oxide comprising cerium oxide and zirconium oxide to have the ability of suppressing the formation of the composite oxide having the spinel-type crystal structure, it is preferred that the cerium oxide and zirconium oxide are added by the equivalent amount or more to the nickel oxide and the cobalt oxide by weight ratio.

As for the noble metal catalyst ingredients loaded on the active alumina coating layer, at least one of platinum (Pt), palladium (Pd) and rhodium (Rh) may be used.

Further, other noble metals such as iridium (Ir), ruthenium (Ru) and osmium (Os) may be added.

DETAILED DESCRIPTION OF THE PREFERRED EMBODIMENTS

Now, the present invention will be described with reference to the following Operation and Comparative Examples.

OPERATION EXAMPLE 1 & COMPARATIVE EXAMPLE 1

100 parts by weight of activated alumina powder with 5 μm of an average particle diameter, 3 parts by weight of boehmite powder ($Al_2O_3.H_2O$) with 5 μm of particle diameter and each amount of nickel oxide. powder with the particle diameter shown in Table 1 were added to distilled water to make slurry.

A honeycomb-shape cordierite monolithic catalyst support substrate with 1.3 λ of volume was immersed in each slurry for catalysts 1H to 1H prepared as above mentioned. After the support substrate was taken out of the slurry, the excessive slurry was blown off. The support substrate was dried at 200° C. for 2 hours and then calcined at 650° C. for 1 hour. Thus, the active alumina coating layer was formed on each of the catalyst support substrates for catalysts 1H to 1H.

Next, thus obtained support substrate having the active alumina coating layer formed thereon was immersed in a mixed aqueous solution of cerium nitrate ($Ce(NO_3)_3$) and zirconium oxynitrate ($ZrO(NO_3)_2$). After the immersion, it was dried at 200° C. for 3 hours and then calcined at 600° C. for 5 hours. In this manner, a composite oxide comprising cerium oxide and zirconium oxide of Operation Example 1 was obtained.

Further, the support substrate was immersed in an aqueous solution containing dinitrodiammine platinum to have platinum catalyst ingredients loaded thereon, and then immersed in an aqueous solution containing rhodium chloride to have rhodium catalyst ingredients loaded thereon. In this manner, catalysts 1A to 1H of Operation Example 1 were obtained.

The addition and loading amounts of each composition are shown in Table 1. Also, the unit "mol/λ" means that number of mols based on the apparent unit volume of the support substrate.

A catalyst of Comparative Example 1 was obtained by using the same method as Operation Example 1 except that the slurry was free from nickel oxide powder and the support substrate having the active alumina coating layer was immersed in an aqueous solution containing the cerium nitrate only.

EVALUATION

Each catalyst thus obtained was evaluated on its hydrogen sulfide emission and catalytic activity.

HYDROGEN SULFIDE EMISSION

The hydrogen sulfide emission was evaluated by passing model gases simulating exhaust gases through each of the catalysts. The compositions of the model gases are shown in Table 2. In detail, the catalyst was kept at 600° C., the model gas having the composition A was passed through each of the catalysts for 10 minutes and then the model gas having the composition B was passed through each of the catalysts for 5 minutes.

CATALYTIC ACTIVITY

Further, each catalyst was attached to an exhaust system of a 3 liter engine and subjected to an aging test for 200 hours under the conditions of the air-fuel ratio (A/F)=14.6 and the inlet gas temperature=850° C. After the aging test, each catalyst was attached to the exhaust system of the identical engine and conversion ratios for hydrocarbon (HC), carbon monoxide (CO) and nitrogen oxides (NOx) were measured under the conditions of the air-fuel ratio (A/F)=14.6 and the inlet gas temperature=400° C. The results are shown in Table 1.

RESULT OF EVALUATION ON CATALYTIC ACTIVITY

Also, all catalysts of Operation Example 1 showed HC, CO and NOx conversion ratios of nearly 90% or more. The values were improved and superior to the catalyst of Comparative Example 1.

OPERATION EXAMPLE 2 & COMPARATIVE EXAMPLE 2

Slurry for Operation Example 2 was made in the same manner as Operation Example 1 except that cobalt oxide powder was used instead of the nickel oxide pow-

TABLE 1

| | Operation Example | | | | | | | | Comparative Example |
|---|---|---|---|---|---|---|---|---|---|
| Catalyst No. | 1A | 1B | 1C | 1D | 1E | 1F | 1G | 1H | 1 |
| NiO particle diameter ($\mu$m) | 2 | 5 | 10 | 20 | 5 | 5 | 5 | 5 | — |
| NiO addition (mol/l) | 0.05 | 0.05 | 0.05 | 0.05 | 0.01 | 0.03 | 0.10 | 0.30 | — |
| Ce addition (mol/l) | 0.25 | 0.25 | 0.25 | 0.25 | 0.25 | 0.25 | 0.25 | 0.25 | 0.30 |
| Zr addition (mol/l) | 0.05 | 0.05 | 0.05 | 0.05 | 0.05 | 0.05 | 0.05 | 0.05 | — |
| Pt (g/l) | 1.5 | 1.5 | 1.5 | 1.5 | 1.5 | 1.5 | 1.5 | 1.5 | 1.5 |
| Rh (g/l) | 0.3 | 0.3 | 0.3 | 0.3 | 0.3 | 0.3 | 0.3 | 0.3 | 0.3 |
| $H_2S$ emission (ppm) | 0.2 | 0.5 | 0.5 | 0.8 | 1.5 | 0.8 | 0.3 | 0.1 | 32.0 |
| HC conversion ratio (%) | 91 | 93 | 94 | 93 | 94 | 93 | 92 | 89 | 88 |
| CO conversion ratio (%) | 89 | 94 | 95 | 96 | 95 | 95 | 93 | 90 | 87 |
| NOx conversion ratio (%) | 89 | 93 | 94 | 94 | 96 | 93 | 92 | 89 | 87 |

TABLE 2

| | $C_3H_6$ | CO | $H_2$ | NO | $O_2$ | $H_2O$ | $CO_2$ | $SO_2$ | (volume %) $N_2$ |
|---|---|---|---|---|---|---|---|---|---|
| Composition A | 0.08 | 0.1 | 0.03 | 0.28 | 1.1 | 10.0 | 10.0 | 70 ppm | balance |
| Composition B | 0.11 | 3.8 | 1.2 | 0.11 | 0.25 | 10.0 | 10.0 | — | balance |

RESULT OF EVALUATION ON HYDROGEN SULFIDE EMISSION

As can be seen from Table 1, all catalysts of Operation Example 1 are superior to the catalyst of Comparative Example 1 in $H_2S$ emission That is because even the catalyst 1E loaded with the least amount of nickel oxide showed 1.5 ppm in $H_2S$ emission and each of other catalysts of Operation Example 1 showed $H_2S$ emission of not more than 1.0 ppm. On the other hand, the catalyst of Comparative Example 1 free from the nickel oxide showed 32.0 ppm in $H_2S$ emission.

Accordingly, the presence of the nickel oxide and the composite oxide comprising cerium oxide and zirconium oxide are effective to decrease $H_2S$ emission. It is most preferred that the particle diameter of nickel oxide is 2 to 10 $\mu$m and the addition amount thereof is 0.03 to 0.30 mol/$\lambda$.

der. Catalysts of Operation Example 2 were obtained in the same process as Operation Example 1 expect that the above slurry was coated on a heat resistance metal honeycomb-shape support substrate having 1.0 $\lambda$ of volume. Here, palladium nitride was used for loading palladium on the active alumina coating layer. A catalyst of Comparative Example 2 was obtained in the same process as Comparative Example 1. Here, palladium nitride was also used for loading palladium on the active alumina coating layer. In the same manner as mentioned above, $H_2S$ emission and catalytic activity were evaluated. The addition and loading amounts of each composition and the results of the evaluation are shown in Table 3.

TABLE 3

| | Operation Example | | | | | | | | Comparative Example |
|---|---|---|---|---|---|---|---|---|---|
| Catalyst No. | 2A | 2B | 2C | 2D | 2E | 2F | 2G | 2H | 2 |
| CoO particle diameter ($\mu$m) | 2 | 5 | 10 | 20 | 5 | 5 | 5 | 5 | — |
| CoO addition (mol/l) | 0.05 | 0.05 | 0.05 | 0.05 | 0.01 | 0.03 | 0.10 | 0.30 | — |
| Ce addition (mol/l) | 0.25 | 0.25 | 0.25 | 0.25 | 0.25 | 0.25 | 0.25 | 0.25 | 0.30 |
| Zr addition (mol/l) | 0.05 | 0.05 | 0.05 | 0.05 | 0.05 | 0.05 | 0.05 | 0.05 | — |
| Pt (g/l) | 0.4 | 0.4 | 0.4 | 0.4 | 0.4 | 0.4 | 0.4 | 0.4 | 0.4 |
| Pd (g/l) | 0.6 | 0.6 | 0.6 | 0.6 | 0.6 | 0.6 | 0.6 | 0.6 | 0.6 |
| Rh (g/l) | 0.1 | 0.1 | 0.1 | 0.1 | 0.1 | 0.1 | 0.1 | 0.1 | 0.1 |
| $H_2S$ emission (ppm) | 0.3 | 0.6 | 0.7 | 0.8 | 1.8 | 0.8 | 0.4 | 0.2 | 28.4 |
| HC conversion ratio (%) | 86 | 88 | 88 | 88 | 91 | 89 | 88 | 86 | 87 |
| CO conversion ratio (%) | 85 | 88 | 89 | 90 | 92 | 90 | 87 | 85 | 85 |
| NOx conversion ratio (%) | 83 | 87 | 88 | 88 | 89 | 89 | 88 | 86 | 87 |

RESULT OF EVALUATION ON HYDROGEN SULFIDE EMISSION

As can be seen from Table 3, the catalysts of Operation Example 2 showed decreased $H_2S$ emission compared with the catalyst of Comparative Example 2 similarly in the case of catalysts of Operation Example 1 employing nickel oxide. By adding 0.01 mol/λ of cobalt oxide in the slurry, for instance catalyst 2E of Operation Example 2, H$_2$S emission of catalyst 2E is remarkably decreased to 1.8 ppm compared with H$_2$S emission of 28.4 ppm of the catalyst of Comparative Example 2. Further, as the addition amount of cobalt oxide increased, H$_2$S emission decreased to values not more than 1.0 ppm. It is most preferred that the particle diameter of the cobalt oxide is 2 to 10μm and the addition amount thereof is 0.03 to 0.3 mol/λ as in the case of the nickel oxide. When catalysts employ such cobalt oxide, they suppress the emission of hydrogen sulfide most.

RESULT OF EVALUATION ON CATALYTIC ACTIVITY

Also, all catalysts of Operation Example 2 showed HC, CO and NOx conversion ratios equivalent to or superior to those of the catalyst of Comparative Example 2.

In Operation Examples 1 and 2, each of nickel oxide and cobalt oxide was employed independently, however, the same effect can be obtained when both of them are employed simultaneously. Further, the same effect is also obtained when the catalysts employ palladium and rhodium; i.e. Pd-Rh catalyst, for the noble metal catalyst ingredients.

In case that the particle diameter of nickel oxide and cobalt oxide is less than 0.5 μm, the durability of the catalyst for purification of exhaust gases deteriorates because of the facilitated reaction of nickel oxide and cobalt oxide with alumina. Also, in case that the particle diameter thereof is more than 30 μm, the effect of suppressing hydrogen sulfide emission deteriorates. On the other hand, in case that the addition amount thereof is less than 0.01 mol/λ, the effect of suppressing hydrogen sulfide emission also deteriorates, and in case that the addition amount thereof is more than 0.5 mol/λ, the durability of the catalyst for purification of exhaust gases deteriorates.

What is claimed is:

1. A catalyst for purification of exhaust gases comprising:
    a support substrate;
    an active alumina coating layer comprising at least one of nickel oxide and cobalt oxide formed on the surface of said support substrate;
    a composite oxide consisting essentially of cerium oxide and zirconium oxide formed in said active alumina coating layer; and
    a noble metal catalyst component comprising at least one of platinum, palladium and rhodium loaded on said active alumina coating layer.

2. A catalyst for purification of exhaust gases according to claim 1,
    wherein said at least one of nickel oxide and cobalt oxide is present as particles having an average particle diameter of from 0.1 to 30 μm.

3. A catalyst for purification of exhaust gases according to claim 2,
    wherein said average particle diameter of said at least one of nickel oxide and cobalt oxide is from 2 to 10 μm.

4. A catalyst for purification of exhaust gases according to claim 1,
    wherein said at least one of nickel oxide and cobalt oxide is present in said active alumina coating layer in an amount of from 0.01 to 0.50 mol per an apparent unit volume of said support substrate.

5. A catalyst for purification of exhaust gases according to claim 4,
    wherein said at least one of nickel oxide and cobalt oxide is present in said active alumina coating layer in an amount of from 0.02 to 0.30 mol per an apparent unit volume of said support substrate.

6. A catalyst for purification of exhaust gases according to claim 1,
    wherein nickel oxide and cobalt oxide are in the form of particles mixed with active alumina in said active alumina coating layer.

7. A catalyst for purification of exhaust gases according to claim 1,
    wherein the ratio of the number of zirconium atoms to cerium atoms present in a form of composite oxide and/or solid solution is from 5:95 to 80:20.

8. A catalyst for purification of exhaust gases according to claim 1,
    wherein said active alumina coating layer is formed by contacting said support substrate with a slurry comprising active alumina particles and particles of at least one of said nickel oxide and said cobalt oxide, and
    said composite oxide is formed by contacting said active alumina layer with a mixed aqueous solution of cerium and zirconium and calcinating the resulting solution-impregnated active alumina layer at a temperature of 600° C. or more.

* * * * *

UNITED STATES PATENT AND TRADEMARK OFFICE
CERTIFICATE OF CORRECTION

PATENT NO. : 4,957,896
DATED : September 18, 1990
INVENTOR(S) : SHINICHI MATSUMOTO ET AL.

It is certified that error appears in the above-identified patent and that said Letters Patent is hereby corrected as shown below:

ON THE TITLE PAGE:

In the inventor's column, please add --Masayasu Sato, Osaka-- before "Hirofumi Shinjoh".

Column 1, line 44, please correct "a" to --as--.

Column 3, line 8, please correct "mol/$\lambda$" to --mol/l--.

Column 3, line 9, please correct "mol/$\lambda$" (both occurrences) to --mol/l--.

Column 3, line 11, please correct "mol/$\lambda$" to --mol/l--.

Column 3, line 13, please correct "mol/$\lambda$" to --mol/l--.

Column 4, line 16, please correct "oxide." to --oxide--.

Column 4, line 20, please correct "$\lambda$" to --l--.

Column 4, line 21, please correct "1H" to --1A--.(1st. Occur)

Column 4, line 27, please correct "1H" (the first occurrences) to --1A--.

Column 4, line 45, please correct "mol/$\lambda$" to --mol/l--.

UNITED STATES PATENT AND TRADEMARK OFFICE
CERTIFICATE OF CORRECTION

PATENT NO. : 4,957,896
DATED : September 18, 1990
INVENTOR(S) : SHINICHI MATSUMOTO ET AL.

It is certified that error appears in the above-identified patent and that said Letters Patent is hereby corrected as shown below:

Column 5, line 40, please add --.-- after "emission".

Column 5, the last line, please correct "mol/$\lambda$" to --mol/l--.

Column 6, line 9, please correct "COMPARATIVE3" to --COMPARATIVE--.

Column 6, line 38, please correct "$\lambda$" to --l--.

Column 7, line 12, please correct "mol/$\lambda$as" to --mol/las--.

Column 7, line 39, please correct "mol/$\lambda$" to --mol/l--.

Column 7, line 41, please correct "mol/$\lambda$" to --mol/l--.

Signed and Sealed this

Twenty-fourth Day of November, 1992

Attest:

DOUGLAS B. COMER

Attesting Officer — Acting Commissioner of Patents and Trademarks